United States Patent [19]

Neeff et al.

[11] 4,096,111
[45] Jun. 20, 1978

[54] BULK DYEING OF POLYESTERS

[75] Inventors: Rütger Neeff; Heinz Dietrich Jordan, both of Leverkusen, Germany

[73] Assignee: Bayer Aktiengesellschaft, Leverkusen-Bayerwerk, Germany

[21] Appl. No.: 671,985

[22] Filed: Mar. 30, 1976

Related U.S. Application Data

[63] Continuation of Ser. No. 526,932, Nov. 25, 1974, abandoned.

[30] Foreign Application Priority Data

Dec. 6, 1973 Germany .............................. 2360875

[51] Int. Cl.² .............................................. C08K 5/47
[52] U.S. Cl. .................................. 260/40 P; 260/303
[58] Field of Search ............................ 260/40 P, 303

[56] References Cited

U.S. PATENT DOCUMENTS

| | | | |
|---|---|---|---|
| 3,318,903 | 5/1967 | Peter et al. | 260/303 |
| 3,447,886 | 6/1969 | Peter et al. | 260/303 |
| 3,720,693 | 3/1973 | Peters et al. | 260/40 P |

*Primary Examiner*—Sandra M. Person
*Attorney, Agent, or Firm*—Plumley & Tyner

[57] ABSTRACT

Process for the bulk dyeing of synthetic linear polyesters, characterized in that one or more dyestuffs of the formula

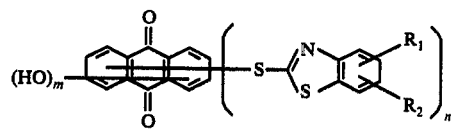

wherein $R_1$ and $R_2$ denote hydrogen or a non-ionic substituent, $m$ denotes an integer from 0 to 2 and $n$ denotes an integer from 1 to 4 and $m$ and $n$ together are not greater than 4, are employed.

6 Claims, No Drawings

BULK DYEING OF POLYESTERS

This is a continuation of application Ser. No. 526,932, filed Nov. 25, 1974, and now abandoned.

The subject of the invention is a process for the bulk dyeing of synthetic linear polyesters with one or more dyestuffs of the formula

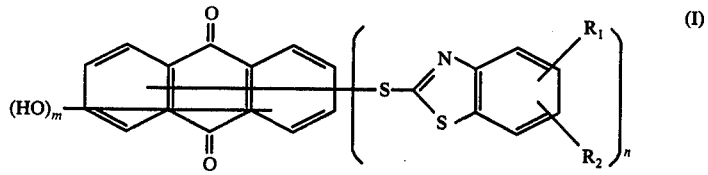

(I)

wherein
$R_1$ and $R_2$ denote hydrogen or non-ionic substituents,
$m$ denotes an integer from 0 to 2 and
$n$ denotes an integer from 1 to 4 and
$m$ and $n$ together are not greater than 4.

Preferred dyestuffs within the scope of the formula I are those which carry the benzthiazolylthio groups and hydroxyl groups in the α-position.

Very particularly preferred compounds are those in which $R_1$ and $R_2$ denote hydrogen.

Hitherto, only a limited number of dyestuffs are available for dyeing linear polyesters, especially for the manufacture of transparent dyed fibres. Very many of the dyestuffs known for dyeing plastics are unsuitable for dyeing linear polyesters because these dyestuffs, on addition to the condensation melt, or before spinning, lose their colour shade, their fastness properties or other desirable properties as a result of the high temperatures of 290°–300° C and the added catalysts such as, for example, phosporic acid, manganese acetate and antimony trioxide. Since most organic pigments are also not stable under the conditions which arise during the preparation or processing of linear polyesters, inorganic pigments have been used for colouring the polyesters, but these give pale-coloured and cloudy colour shades without the clarity and transparency desired for many purposes.

Surprisingly, it has now been found that brilliant, deep, transparent and very fast dyeings are obtained with the dyestuffs of the formula I when bulk-dyeing linear polyesters.

Examples of suitable non-ionic substituents $R_1$ and $R_2$ are halogen atoms such as fluorine, chlorine or bromine, straight-chain or branched-chain alkyl groups with 1 to 12 C atoms such as the methyl, ethyl, propyl, i-propyl, butyl, i-butyl, tert.-butyl, amyl, octyl or dodecyl group, preferably $C_1$–$C_4$-alkyl groups, alkoxy groups, preferably $C_1$–$C_4$-alkoxy groups, such as the methoxy, ethoxy, propoxy or butoxy group, trifluoromethyl and difluoromethyl groups, alkylsulphonyl groups, especially those with 1 to 4 C atoms, sulphonamide groups which are optionally substituted at the nitrogen by $C_1$–$C_4$-alkyl or benzyl groups, aralkoxy groups, preferably benzyloxy radicals, and aryloxy groups, especially phenoxy groups, it being possible for the benzyloxy and phenoxy groups to be substituted further by halogen atoms, $C_1$–$C_4$-alkyl groups and $C_1$–$C_4$-alkoxy groups.

The linear polyesters used are in particular linear aromatic polyesters such as polyethylene terephthalate or polyesters of terephthalic acid and 1,4-bis-(hydroxymethyl)-cyclohexane, as well as basic-modified or acid-modified linear aromatic polyesters, such as polyethylene terephthalate modified with sulpho-isophthalic acid.

To carry out the process it is possible, for example, to add one or more of the dyestuffs according to the invention to a condensation melt of dimethyl terephthalate, ethylene glycol and a manganese acetate/phosphoric acid catalyst, complete the condensation in the usual manner and spin the dyed melt to give filaments, or mould it to give solid articles.

However, it is also possible to mix one or more of the said dyestuffs with the finished linear polyesters in the usual manner and then to manufacture the dyed polyester by a spinning or moulding process. For this purpose, the material to be dyed, in the form of powders, granules or chips, is mixed with the finely divided dry dyestuff, for example in a lacquering drum, in such a way that the surface of the material is coated with a layer of the dyestuff, after which the polyester particles covered with dyestuff can be fused, and spun or moulded in accordance with known processes. Under certain circumstances the covering of the polyester particles with dyestuff can also be carried out by using a dispersion of the dyestuff in a volatile liquid such as water or alcohol and preferably evaporating off the volatile liquid before fusing the polyester particles covered with dyestuff.

The compounds according to the invention are surprisingly stable under the conditions prevailing in the condensation melt during the preparation of the linear polyesters, and during the spinning process, do not modify the viscosity of the polyester melt and do not impair the properties of the linear polyesters, and of the fibres manufactured therefrom, even in the case of deep dyeings. The linear polyesters dyed in accordance with the invention exhibit attractive clear and transparent colour shades which possess very good fastness properties.

EXAMPLE 1a 99 g of polyethylene terephthalate in the form of pellets are mixed with 1 g of finely divided 1,4,5,8-tetra-(2-benzthiazolyl-thio)-anthraquinone in a drum, until the polyester particles are uniformly covered with dyestuff. The resulting mixture is fused and then spun in the usual manner at 290°–295° C.

The filament thus obtained is dyed in yellowish-tinged red shades. The dyeing has excellent fastness to light, washing and thermofixing.

EXAMPLE 1b

The dyestuff used can be prepared as follows: 15 g of 1,4,5,8-tetrachloro-anthraquinone, 75 g of dimethyl-formamide, 35 g of 2-mercaptobenzthiazole and 30 g of potassium carbonate are heated to 125°–130° C for about 3 hours. After cooling, the dyestuff which has precipitated in attractive red prisms is filtered off and washed with methanol and water. After drying, 34 g of 1,4,5,8-tetra-(2-benzthiazolyl-thio)-anthraquinone = 90% of theory are obtained.

If, when manufacturing dyed polyester filaments according to Example 1a, corresponding amounts of the dyestuffs listed in the table which follows are used instead of the 1,4,5,8-tetra-(2-benzthiazolyl-thio)-anthraquinone mentioned in Example 1a, polyester filaments of the indicated colour shades, having excellent fastness to light, washing and thermofixing, are obtained.

of the dyestuffs listed in the table which follows are used instead of the 1,4,5-tri-(2-benzthiazolyl-thio)-anthraquinone mentioned in Example 18a, polyester filaments in yellow-brown colour shades, having excellent fastness to light, washing and thermofixing, are obtained.

| Example | Dyestuff | Colour shade |
|---|---|---|
| 19 | 1,4,5-Tri-(7-methyl-2-benzthiazolyl-thio)-anthraquinone | yellow-brown |
| 20 | 1,4,5-Tri-(6-methoxy-2-benzthiazolyl-thio)-anthraquinone | yellow-brown |
| 21 | 1,4,5-Tri-(6-dimethylamino-sulphonyl-2-benzthiazolyl-thio)-anthraquinone | yellow-brown |
| 22 | 1,4,5-Tri-(6-ethylsulphonyl-2-benzthiazolyl-thio)-anthraquinone | yellow-brown |
| 23 | 1,4,5-Tri-(5,6-dichloro-2-benzthiazolyl-thio)-anthraquinone | yellow-brown |

| Example | Dyestuff | Colour shade |
|---|---|---|
| 2 | 1,4,5,8-Tetra-(5-methyl-2-benzthiazolyl-thio)-anthraquinone | yellowish-tinged red |
| 3 | 1,4,5,8-Tetra-(6-ethyl-2-benzthiazolyl-thio)-anthraquinone | yellowish-tinged red |
| 4 | 1,4,5,8-Tetra-(6-tert.butyl-2-benzthiazolyl-thio)-anthraquinone | yellowish-tinged red |
| 5 | 1,4,5,8-Tetra-(6-isooctyl-2-benzthiazolyl-thio)-anthraquinone | yellowish-tinged red |
| 6 | 1,4,5,8-Tetra-(2-methoxy-2-benzthiazolyl-thio)-anthraquinone | red |
| 7 | 1,4,5,8-Tetra-(5-isopropoxy-2-benzthiazolyl-thio)-anthraquinone | red |
| 8 | 1,4,5,8-Tetra-(5,6-dimethyl-2-benzthiazolyl-thio)-anthraquinone | yellowish-tinged red |
| 9 | 1,4,5,8-Tetra-(5-chloro-2-benzthiazolyl-thio)-anthraquinone | yellowish-tinged red |
| 10 | 1,4,5,8-Tetra-(6-bromo-2-benzthiazolyl-thio)-anthraquinone | yellowish-tinged red |
| 11 | 1,4,5,8-Tetra-(4-fluoro-2-benzthiazolyl-thio)-anthraquinone | yellowish-tinged red |
| 12 | 1,4,5,8-Tetra-(5-difluoromethyl-2-benzthiazolyl-thio)-anthraquinone | yellowish-tinged red |
| 13 | 1,4,5,8-Tetra-(5-trifluoromethyl-2-benzthiazolyl-thio)-anthraquinone | yellowish-tinged red |
| 14 | 1,4,5,8-Tetra-(5,6-dichloro-2-benzthiazolyl-thio)-anthraquinone | yellowish-tinged red |
| 15 | 1,4,5,8-Tetra-(6-methylsulphonyl-2-benzthiazolyl-thio)-anthraquinone | yellowish-tinged red |
| 16 | 1,4,5,8-Tetra-(6-aminosulphonyl-2-benzthiazolyl-thio)-anthraquinone | yellowish-tinged red |
| 17 | 1,4,5,8-Tetra-(6-dimethylaminosulphonyl-2-benzthiazolyl-thio)-anthraquinone | yellowish-tinged red |

EXAMPLE 18a 100 g of terephthalic acid dimethyl ester, 71 g of ethylene glycol, 0.05 g of manganese-(II) acetate and 0.04 g of phosphoric acid are stirred for 4 hours at 197° C whilst distilling off the methanol. 3 g of 1,4,5-tri-(2-benzthiazolyl-thio))-anthraquinone in 12 g of ethylene glycol are now added and the condensation is completed in 6 hours at 277° C and 0.3 mm Hg whilst distilling off the excess ethylene glycol. When the melt is spun in the usual manner, deep yellow-brown filaments are obtained, the dyeing of which has excellent fastness to light, washing and thermofixing.

EXAMPLE 18b

The dyestuff used can be prepared as follows: 20 g of 4,5-dicloro-1-nitro-anthraquinone and 16g of potassium carbonate are heated with 38 g of 2-mercapto-benzthiazole in 100 g of dimethylformamide to 125°–130° C for about 3 hours. After cooling, the product which crystallises in red-brown prisms is filtered off and washed with a little methanol and water, and after drying 40 g of 1,4,5-tri-(2-benzthiazolyl-thio)-anthraquinone = 91.5% of theory are obtained.

If, when manufacturing dyed polyester filaments in accordance with Example 18a, corresponding amounts

EXAMPLE 24a 99 g of the polyester of terephthalic acid and 1,4-bis-(hydroxymethyl)-cyclohexane, in the form of chips, are mixed with one part of finely divided 1,5-di-(2-benzthiazolyl-thio)-anthraquinone until the polyester particles are uniformly covered. The resulting mixture is fused and customary spinning at 290°–295° C gives a filament dyed clear yellow, the dyeing of which shows excellent fastness to light, washing and thermofixing.

EXAMPLE 24b

The dyestuff used can be prepared as follows: 15 g of 1,5-dichloro-anthraquinone and 9 g of potassium carbonate are heated with 22 g of 2-mercapto-benzthiazole in 60 g of dimethylformamide for about 3 hours to 125°–130° C. After cooling, the product which has crystallized out in yellow prisms is filtered off and washed with a little methanol and water, and after drying 26.8 g of 1,5-di-(2-benzthiazolyl-thio)-anthraquinone = 92% of theory are obtained.

If, when manufacturing dyed polyester filaments according to Example 24a, corresponding amounts of the dyestuffs listed in the table which follows are used instead of the 1,5-di-(2-benzthiazolyl-thio)-anthraquinone mentioned in Example 24a, polyester filaments in the indicated color shades, having excellent fastness to light, washing and thermofixing, are obtained.

| Example | Dyestuff | Colour shade |
|---|---|---|
| 25 | 1,5-Di-(5-butoxy-2-benzthiazolyl-thio)-anthraquinone | yellow |
| 26 | 1,5-Di-(5,6-dichloro-2-benzthiazolyl-thio)-anthraquinone | yellow |
| 27 | 1,8-Di-(2-benzthiazolyl-thio)-anthraquinone | reddish-tinged yellow |
| 28 | 1,8-Di-(6-ethoxy-2-benzthiazolyl-thio)-anthraquinone | reddish-tinged yellow |
| 29 | 1,8-Di-(6-phenoxy-2-benzthiazolyl-thio)-anthraquinone | reddish-tinged yellow |
| 30 | 1-(5-benzyloxy-2-benzthiazolyl-thio)-anthraquinone | yellow |
| 31 | 1-(6-(2-Phenylethyloxy)-2-benzthiazolyl-thio)-anthraquinone | yellow |
| 32 | 1-(6-(4-Chlorobenzyloxy)-2-benzthiazolyl-thio)-anthraquinone | yellow |
| 33 | 1-(4-(4-Methylbenzyloxy)-2-benzthiazolyl-thio)-anthraquinone | yellow |

| Example | Dyestuff | Colour shade |
|---|---|---|
| 34 | 1-6-(4-Methoxybenzyloxy)-2-benzthiazolyl-thio)-anthraquinone | yellow |
| 35 | 1-(6-(4-Methoxyphenoxy)-2-benzthiazolyl-thio)-anthraquinone | yellow |
| 36 | 1-(6-(3,4-Dichlorophenoxy)-2-benzthiazolyl-thio)-anthraquinone | yellow |
| 37 | 1-(5,6-Dichloro-2-benzthiazolyl-thio)-anthraquinone | yellow |

EXAMPLE 38a 99 g of polyethylene terephthalate in the form of pellets are mixed with 1 g of finely divided 1,3,5,7-tetra-(2-benzthiazolyl-thio)-anthraquinone in a drum, until the polyester particles are uniformly covered with dyestuff. The resulting mixture is fused and spun in the usual manner at 290°–295° C. The filament thus obtained is dyed reddish-tinged yellow. The dyeing exhibits excellent fastness to light, washing and thermofixing.

EXAMPLE 38b

The dyestuff used can be prepared as follows 15 g of 1,3,5,7-tetrachloro-anthraquinone and 30 g of potassium carbonate are warmed with 35 g of 2-mercapto-benzthiazole in 80 g of dimethylformamide for 5 hours to 125°–130° C. After cooling, the product which has crystallised in yellow-brown prisms is filtered off and washed with a little methanol and water, and after drying 35 g of 1,3,5,7-tetra-(2-benzthiazoly-lthio)-anthraquinone = 93% of theory are obtained.

EXAMPLE 39

If the procedure indicated in Example 38a is followed and, instead of the dyestuff mentioned there, corresponding amounts of 1,4,6-tri-(2-benzthiazolyl-thio)-anthraquinone are used, an orange-coloured dyeing is obtained, which is distinguished by very good fastness to light, washing and thermofixing.

EXAMPLE 40a 99 g of polyethylene terephthalate are mixed in a drum with 1 g of 1,5-dihydroxy-4,8-di-(2-benzthiazolyl-thio)-anthraquinone and 3 g of water until a uniform mixture is obtained, and the mixture is dried at 100° C. The mixture is then fused and spun in the usual manner at 290°–295° C, giving filaments dyed deep bluish-tinged violet, the dyeing of which exhibits excellent fastness to light, washing and thermofixing.

EXAMPLE 40b

The dyestuff used can be prepared as follows: 20 g of 1,5-dihydroxy-4,8-dinitro-anthraquinone and 11 g of potassium carbonate are heated with 26 g of 2-mercaptobenzthiazole in 80 parts of dimethylformamide at 125°–135° C until the formation of the dyestuff has ended. After cooling, the product which has crystallized out in violet prisms is filtered of and washed with methanol and water, and after drying 31 g of 1,5-dihydroxy-4,8-di-(2-benzthiazolyl-thio)-anthraquinone = 89.5% of theory are obtained.

EXAMPLE 41

If the procedure indicated in Example 40a is followed and, instead of the dyestuff mentioned there, corresponding amounts of 1,8-dihydroxy-4,5-(2-benzthiazole-thio)-anthraquinone are used, a deep violet dyeing is obtained, which is distinguished by very good fastness to light, washing and thermofixing.

EXAMPLE 42

99 g of polyethylene terephthalate in the form of granules are mixed with 1 g of 1,4-dihydroxy-2-(2-benzthiazolyl-thio)-anthraquinone and 3 g of glycol monomethyl ether until a uniform mixture is obtained, which is then dried in vacuo at 120° C. After fusing the mixture and customary spinning at 290°–295° C, filaments dyed scarlet are obtained, the dyeing of which has very good fastness to light, washing and thermofixing. Polyester filaments dyed scarlet are also obtained when, instead of the abovementioned 1,4-dihydroxy-2-(2-benzthiazolyl-thio)-anthraquinone, corresponding amounts of 1,4-dihydroxy-2-(5-methyl-, 6-methoxy-, 4-chloro- or 7-bromo-2-benzthiazolyl-thio)-anthraquinone are used.

We claim:

1. Process for the bulk dyeing of synthetic linear polyesters, characterised in that one or more dyestuffs of the formula

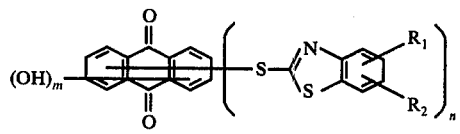

wherein
$R_1$ and $R_2$ denote hydrogen or a non-ionic substituent,
$m$ denotes an integer from 0 to 2 and
$n$ denotes an integer from 1 to 4 and
$m$ and $n$ together are not greater than 4,
are employed.

2. Process according to claim 1, characterised in that dyestuffs of claim 1 which carry the benzthiazolylthio groups and hydroxyl groups in the α-positions are employed.

3. Process according to claim 1, characterised in that dyestuffs of claim 1 in which
$R_1$ and $R_2$ represent hydrogen
are employed.

4. In the process of bulk dyeing of synthetic linear polyester in which a polyester is melt spun with a dyestuff dispersed therein, the improvement comprising using as said dyestuffs an anthraquinone dyestuff of the formula

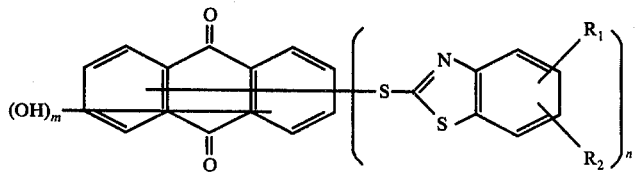

wherein
$R_1$ and $R_2$ are hydrogen or a non-ionic substituent;
$m$ is an integer from 0 to 2;

$n$ is an integer from 1 to 4; and $m$ plus $n$ is not greater than 4.

5. Process of claim 4 in which the dyestuff contains the benzthiazolylthio groups and hydroxyl groups in the α-position.

6. Process of claim 4 in which $R_1$ and $R_2$ are hydrogen.

* * * * *